United States Patent [19]

Bundo et al.

[11] Patent Number: 5,201,239
[45] Date of Patent: Apr. 13, 1993

[54] INDUSTRIAL ROBOT WITH WRIST ACTUATOR MECHANISM

[75] Inventors: Isao Bundo; Hiroshi Miwa, both of Sayama, Japan

[73] Assignee: Honda Gikenn Kogyo Kabushiki Kaisha, Tokyo, Japan

[21] Appl. No.: 774,571

[22] Filed: Oct. 8, 1991

[30] Foreign Application Priority Data

Oct. 16, 1990 [JP] Japan .................................. 2-277019

[51] Int. Cl.$^5$ .......................... G05G 11/00; B25J 18/00
[52] U.S. Cl. ....................................... 74/479; 901/23; 901/26; 901/29
[58] Field of Search ...................... 74/479; 901/15, 23, 901/24, 26, 29, 48

[56] References Cited

U.S. PATENT DOCUMENTS

| | | | |
|---|---|---|---|
| 4,507,046 | 3/1985 | Sugimoto et al. | 414/735 |
| 4,512,710 | 4/1985 | Flatau | 901/15 X |
| 4,527,945 | 7/1985 | Passemard et al. | 414/735 |
| 4,793,203 | 12/1988 | Staggl et al. | 74/479 |
| 4,804,304 | 2/1989 | Tellden | 901/26 X |
| 4,842,474 | 6/1989 | Torii et al. | 74/479 X |
| 4,846,015 | 7/1989 | Keppler et al. | 901/29 X |
| 4,972,735 | 11/1990 | Torii et al. | 74/665 M |

FOREIGN PATENT DOCUMENTS

| | | | |
|---|---|---|---|
| 108569 | 5/1984 | European Pat. Off. | 901/26 |
| 57-27686 | 2/1982 | Japan . | |
| 2-298482 | 12/1990 | Japan | 901/26 |
| 2-303778 | 12/1990 | Japan | 901/26 |
| 2133770 | 8/1984 | United Kingdom | 901/23 |
| 87/07555 | 12/1987 | World Int. Prop. O. . | |

*Primary Examiner*—Allan D. Herrmann
*Assistant Examiner*—David W. Laub

[57] ABSTRACT

An industrial robot includes a a hollow arm extending from a robot base, a wrist base mounted on a distal end of the hollow arm for rotation about a longitudinal axis of the hollow arm, a wrist mounted on a distal end of the wrist base for swinging movement about an axis transverse to the longitudinal axis, and a wrist socket mounted on a distal end of the wrist for rotation about an axis parallel to the longitudinal axis. The industrial robot also includes first, second, and third actuators such as motors. The first actuator is fixedly mounted on a rear end of the arm remotely from the wrist base and produces rotational drive forces that are transmitted to rotate the wrist base. The second actuator is fixedly mounted on the rear end of the arm and produces rotational drive forces that are transmitted to swing the wrist. The third actuator is fixedly mounted on the wrist and produces rotational drive forces that are transmitted to rotate the wrist socket.

8 Claims, 3 Drawing Sheets

INDUSTRIAL ROBOT WITH WRIST ACTUATOR MECHANISM

BACKGROUND OF THE INVENTION

1. Field of the Invention

The present invention relates to an industrial robot, and more particularly to an industrial robot with an improved wrist actuator mechanism.

2. Description of the Prior Art

One known industrial robot is disclosed in Japanese Laid-Open Patent Publication No. 60-44288, for example.

The disclosed industrial robot comprises a substantially hollow cylindrical wrist base mounted on the tip end of an arm extending from a robot base and rotatable about the axis of the arm, a wrist mounted on the tip end of the wrist base for swinging movement about an axis normal to the arm axis, and a wrist socket mounted on the tip end of the wrist for angular movement about an axis parallel to the arm axis. The wrist base, the wrist, and the wrist socket (which will also be referred to as "driven members") can be actuated by an actuator mechanism that includes motors or actuators fixed to the rear end of the arm and operatively coupled to these driven members, respectively. Rotational drive forces generated by the actuators are transmitted through respective shafts in the arm to the wrist base and then through gear transmission mechanisms and speed reducers in the wrist base and the wrist to the respective driven members, for thereby actuating the driven members.

The speed reducers serve to reduce the speeds of rotational drive forces transmitted from the actuators to the respective driven members, at final stages of transmitting paths, to reduce backlash in the gear transmission mechanisms.

As described above, the actuators for actuating the driven members are fixed to the rear end of the arm, and the rotational drive forces produced by the actuators are transmitted through the respective shafts in the arm to the wrist base and then through the gear transmission mechanisms in the wrist base and the wrist and also through the speed reducers to the driven members. Therefore, the gear transmission mechanisms in the wrist base and the wrist are structurally complex in order to avoid physical interference with each other, and hence are made up of a large number of parts.

In addition, since the shafts that transmit the rotational drive forces from the actuators to the wrist base are disposed in the arm, these shafts cannot easily be disassembled and serviced.

One solution to the above problems would be to mount the actuators in the wrist base and the wrist. However, the wrist base and the wrist would not operate quickly and smoothly as they would be required to bear large loads.

SUMMARY OF THE INVENTION

In view of the aforesaid drawbacks, it is an object of the present invention to provide an industrial robot which includes a relatively simple power transmitting mechanism for transmitting rotational drive forces from actuators to a wrist base, a wrist, and a wrist socket, the power transmitting mechanism being made up of a relatively small number of parts and having a high degree of easy maintenance.

According to the present invention, there is provided an industrial robot comprising a robot base, a hollow arm extending from the robot base, a wrist base mounted on a distal end of the hollow arm for rotation about a longitudinal axis of the hollow arm, a wrist mounted on a distal end of the wrist base for swinging movement about an axis transverse to the longitudinal axis, a wrist socket mounted on a distal end of the wrist for rotation about an axis parallel to the longitudinal axis, a first actuator fixedly mounted on a rear end of the arm remotely from the wrist base, for producing rotational drive forces to rotate the wrist base, first rotation transmitting means for transmitting the rotational drive forces from the first actuator to the wrist base, the first rotation transmitting means having a first rotatable shaft extending through the arm, a second actuator fixedly mounted on the rear end of the arm, for producing rotational drive forces to swing the wrist, second rotation transmitting means for transmitting the rotational drive forces from the second actuator to the wrist, the second rotation transmitting means having a second rotatable shaft extending through the arm, a third actuator fixedly mounted on the wrist, for producing rotational drive forces to rotate the wrist socket, and third rotation transmitting means mounted on the wrist, for transmitting the rotational drive forces from the third actuator to the wrist socket.

The first rotatable shaft comprises a hollow shaft, and the wrist base is of a hollow cylindrical structure, the wrist having a rotatable shaft, the second rotatable shaft extending through the hollow shaft and the wrist base and being connected to the rotatable shaft of the wrist.

The first, second, and third rotation transmitting means include first, second, and third speed reducers, respectively, for reducing the speed of the rotational drive forces produced by the first, second, and third actuators, respectively, the first speed reducer being directly coupled to the first actuator at the rear end of the arm for reducing the speed of the rotational drive forces from the first actuator at an initial stage of the first rotation transmitting means, the second and third speed reducers being directly coupled to the wrist and the wrist socket, respectively, for reducing the speed of the rotational drive forces from the second and third actuators, respectively, at final stages of the second and third rotation transmitting means, respectively.

The second speed reducer is disposed on one side of the rotatable shaft of the wrist across a longitudinal axis thereof, and the third actuator is disposed on the other side of the rotatable shaft of the wrist across the longitudinal axis thereof.

The third speed reducer is positioned between the second speed reducer and the third actuator.

The first rotatable shaft comprises a plurality of separably connected shafts which are separable away from the wrist base at least at an end of the wrist base closer to the arm, and the second rotatable shaft comprises a plurality of separably connected shafts which are separable away from the wrist base and the robot base at least at the end of the wrist base.

The arm includes a hollow arm member fixed to the robot base, the first rotatable shaft comprising a first hollow shaft inserted in the arm member and a second hollow shaft projecting out of the arm member, the wrist base being separably coupled to a distal end of the second hollow shaft, the first and second hollow shafts being separably connected to each other at a distal end of the arm member, the second rotatable shaft being inserted in the first rotatable shaft, the second rotatable shaft including first and second shafts separably connected to each other at the distal end of the arm member, the first and second shafts of the second rotatable shaft being separable away from the wrist base and the robot base at the distal end of the arm member.

Of the first, second, and third actuators for producing rotational drive forces to actuate the wrist base, the wrist, and the wrist socket, respectively, the first and second actuators are fixed to the rear end of the arm, and the third actuator is fixed to the wrist. With this arrangement, the third rotation transmitting means for transmitting the rotational drive forces from the third actuator to the wrist socket is relatively simple in structure and may be made up of a relatively small number of parts. Since the third actuator is required to actuate only the wrist socket, the third actuator may be of a relatively small capacity and reduced in size. Accordingly, the third actuator may be mounted on the wrist without imposing a large load on the wrist base and the wrist. As the load imposed on the wrist base and the wrist socket is relatively small, the wrist base and the wrist socket can operate quickly and smoothly without undue stresses.

The first and second rotation transmitting means transmit the rotational drive forces from the first and second actuators to the wrist base and the wrist through the first and second rotatable shafts, respectively, that extend through the arm. However, since the third rotation transmitting means is mounted in the wrist, the first and second rotation transmitting means are not subject to structural limitations due to the third rotation transmitting means, and hence may be relatively simple in structure.

Of the first, second, and third speed reducers, the second and third speed reducers are directly coupled to the wrist and the wrist socket, respectively, on the distal end of the arm, and the first speed reducer is mounted on the rear end of the arm and directly coupled to the first actuator. This arrangement is effective to reduce the load on the distal end of the arm.

In the case where the second and third rotation transmitting means comprise gear mechanisms, respectively, since the second and third speed reducers are directly coupled to the wrist and the wrist socket, respectively, any effect that the backlash of the gear mechanisms has on the rotation of the wrist and the wrist socket is reduced. The first rotation transmitting means transmits the rotational drive forces from the first actuator to the wrist base that is positioned closer to the rear end of the arm than the wrist and the wrist socket, and the axis about which the wrist base is rotatable extends longitudinally with respect to the arm. Consequently, in the case where the first rotation transmitting means comprises a gear mechanism, it is possible to reduce the number of gears of such a gear mechanism to the extent that the effect of the backlash of the gear mechanism to the rotation of the wrist base is negligibly small. As a result, the wrist and the wrist socket can operate smoothly.

Since the first rotatable shaft comprises a plurality of separably connected shafts which are separable away from the wrist base at least at an end of the wrist base closer to the arm, and the second rotatable shaft comprises a plurality of separably connected shafts which are separable away from the wrist base and the robot base at least at the end of the wrist base, the wrist base can easily be detached from the arm which in turn connected to the robot base. Therefore, the wrist base, the wrist, and the wrist socket can easily be detached from the arm for maintenance and can also easily be assembled on the arm. The industrial robot thus has a high degree of easy maintenance and can be manufactured efficiently.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
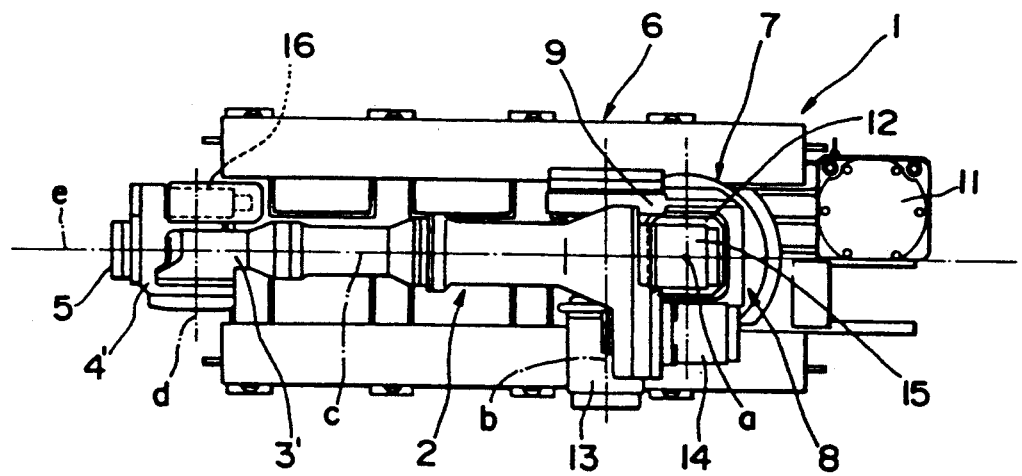
FIG. 1 is a plan view of an industrial robot according to the present invention.
Figure 2:
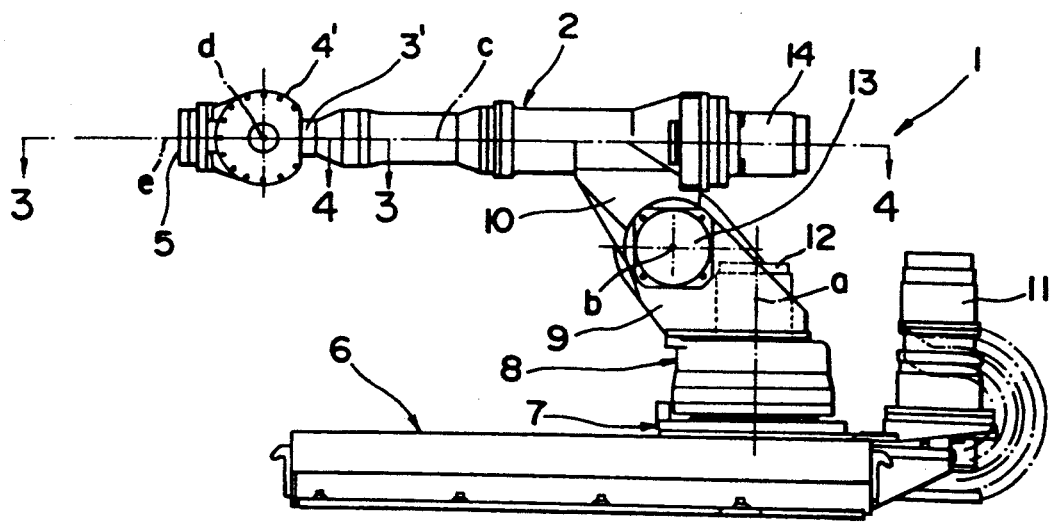
FIG. 2 is a side elevational view of the industrial robot shown FIG. 1.

As shown in FIGS. 1 and 2, an industrial robot according to the present invention includes a robot base 1, a substantially hollow cylindrical arm 2 extending from the robot base 1, a substantially hollow cylindrical wrist base 3' mounted concentrically on the tip end of the arm 2, a wrist 4' mounted on the tip end of the wrist base 3', and a wrist socket 5 mounted on the tip end of the wrist 4'. A hand or end effector (not shown) can be mounted on the wrist socket 5.

The robot base 1 comprises a first base support 6, a second base support 7 horizontally movably supported on the first base support 6 by rails (not shown), a third base support 8 mounted on the second base support 7 for angular movement about a vertical axis a, a shoulder 9 vertically mounted on the third base support 8, and a swing member 10 mounted on the shoulder 9 for swinging movement about a horizontal axis b perpendicular to the direction in which the second base support 7 is movable. The arm 2 extends from the swing member 10 and is vertically swingable with the swing member 10 about the horizontal axis b.

The second base support 7 and the various components supported thereon, including the arm 2, are horizontally movable by an actuator 11 such as a motor with a speed reducer through a rack and pinion (not shown), the actuator 11 being mounted on the first base support 6. The third base support 8 and the various components supported thereon, including the arm 2, are angularly movable about the vertical axis a by an actuator 12 such as a motor with a speed reducer, the actuator 12 being mounted on the second base support 7 coaxially with the vertical axis a. The arm 2 is swingable about the horizontal axis b by an actuator 13 such as a motor with a speed reducer, the actuator 13 being fixed to the shoulder 9 coaxially with the horizontal axis b.

The wrist base 3' is rotatable about an axis c aligned with the central longitudinal axis of the arm 2. The wrist 4' is swingable about an axis d perpendicular to the axis c. The wrist socket 5 is rotatable about an axis e aligned with the axis c. The wrist base 3' can be rotated about the axis c through a first rotation transmitting means (described later on) by a first actuator 14 such as a motor that is fixed to the rear end of the arm 2 remotely from the wrist base 3'. The wrist 4 can be swung about the axis d through a second rotation transmitting means (described later on) by a second actuator 15 such as a motor that is also fixed to the rear end of the arm 2. The wrist socket 5 can be rotated about the axis e through a third rotation transmitting means (described later on) by a third actuator 16 such as a motor that is fixed to wrist 4'.

The wrist base 3', the wrist 4', the wrist socket 5, and an actuator mechanism therefor will be described below with reference to FIGS. 3 and 4.

Figure 4:
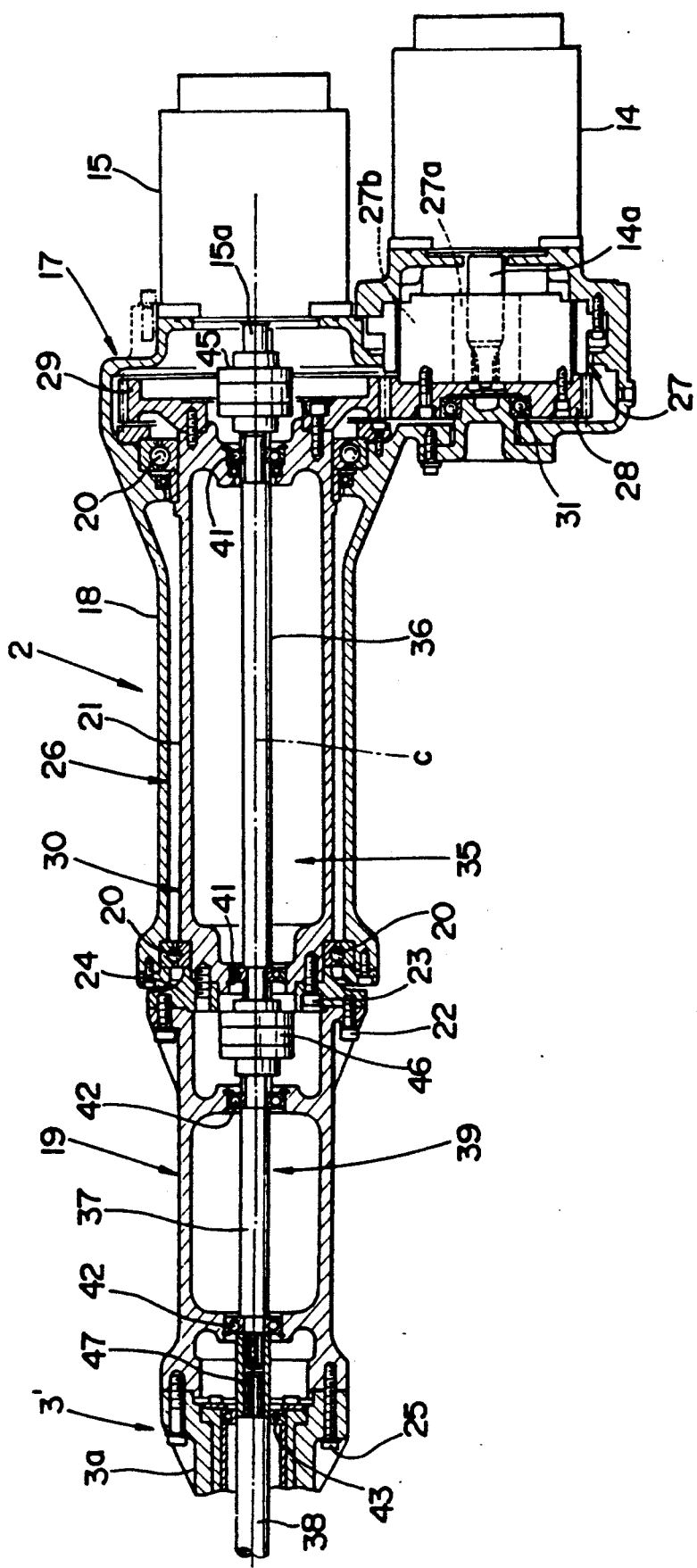
FIG. 4 is a cross-sectional view taken along line 4—4 of FIG. 2.

As shown in FIG. 4, the arm 2 has a housing 17 at its rear end that is fixed to the swing member 10 (see FIG. 2). The arm 2 includes a tubular fixed arm member 18 extending integrally from the housing 17, and a tubular arm shaft 19 attached to the distal end of the fixed arm member 18 for angular movement about the axis c.

A hollow shaft 21 that is rotatably mounted in the fixed arm member 18 by bearings 20 extends substantially the entire length of the fixed arm member 18. The arm shaft 19 is coupled to the distal end of the hollow shaft 21 by a plurality of bolts 22, 23 through an annular coupling 24. The arm shaft 19 and the hollow shaft 21 jointly serve as a first rotatable shaft 30 that is rotatable about the axis c. The second actuator 15 is fixed to the housing 17 remotely from the fixed arm member 18 in concentric relationship to the hollow shaft 21. The first actuator 14 is also fixed to the housing 17 laterally of the second actuator 15 parallel thereto.

Figure 3:
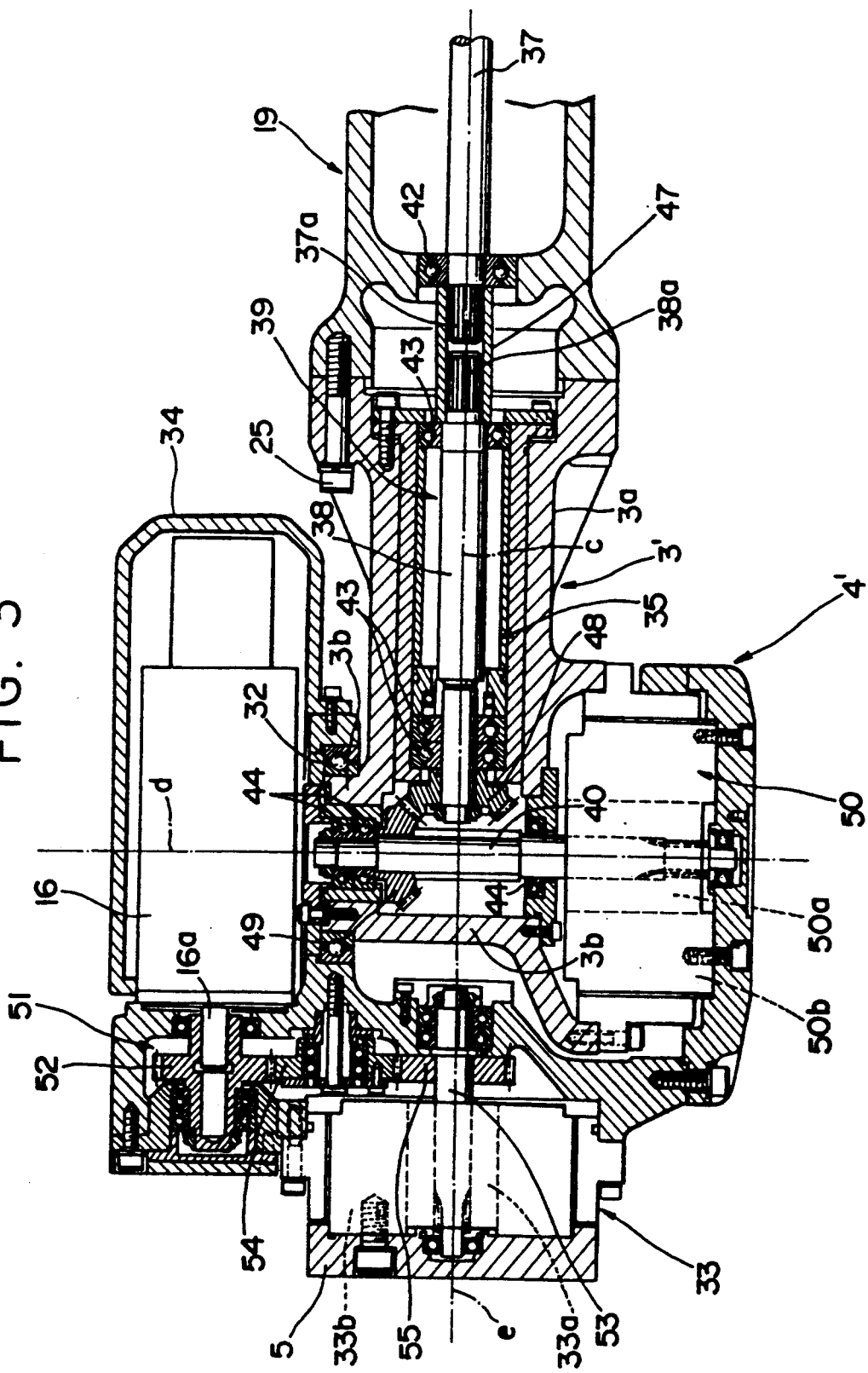
FIG. 3 is a cross-sectional view taken along line 3—3 of FIG. 2.

As illustrated in FIGS. 3 and 4, the wrist base 3' comprises a first hollow shaft 3a coupled coaxially to the distal end of the arm shaft 19 by bolts 25, and a second hollow shaft 3b integral with the distal end of the first hollow shaft 3a. Therefore, the wrist base 3' is angularly movable about the axis c in unison with the arm shaft 19 and the hollow shaft 20, i.e., the first rotatable shaft 30.

In FIG. 4, the first rotation transmitting means, generally denoted at 26, serves to transmit rotational drive forces from the first actuator 14 to the wrist base 3'. The first rotation transmitting means 26 comprises a speed reducer 27 disposed in the housing 17, a drive gear 28, a driven gear 29, and the first rotatable shaft 30. The driven gear 29 is fixed concentrically to the rear end of the hollow shaft 21 for corotation. The drive gear 28 is rotatably supported in the housing 17 by a bearing 31 concentrically with the first actuator 14, the drive gear 28 being held in mesh with the driven gear 29. The speed reducer 27 is disposed in the housing 17 coaxially between the drive gear 28 and the first actuator 14. The speed reducer 27 has an input member 27a coupled directly to a drive shaft 14a of the first actuator 14, and an output member 27b coupled directly to the drive gear 28.

Therefore, the rotational drive forces from the first actuator 14 are reduced in speed by the speed reducer 27, and then transmitted through the gears 28, 29 and the first rotatable shaft 30 to the wrist base 3', which can now be rotated about the axis c.

The wrist 4' is in the form of a hollow case that has a substantially channel-shaped cross section as viewed in FIG. 3. The wrist 4' is mounted on the distal end of the wrist base 3' in sandwiching relationship to the second hollow shaft 3b of the wrist base 3'. The wrist 4' is swingably supported on the outer circumferential surface of one end of the second hollow shaft 3b by a bearing 32 for swinging movement about the axis d. A speed reducer 33 with its axis aligned with the axis e is fixed to the distal end of the wrist 4'. The speed reducer 33 has an output member 33b directly coupled concentrically to the wrist socket 5, which is substantially disc-shaped. The third actuator 16 is secured to a side surface of the wrist 4' parallel to the axis e. The third actuator 16 is enclosed by a cover 34 that is fixed to the wrist 4'.

In FIGS. 3 and 4, the second rotation transmitting means, generally denoted at 35, serves to transmit rotational drive forces from the second actuator 15 to the wrist 4'. The second rotation transmitting means 35 comprises a second rotatable shaft 39 composed of rotatable shafts 36, 37, 38 that extend concentrically in the fixed arm member 18, the arm shaft 19, and the first hollow shaft 3a, respectively, and a rotatable shaft 40 inserted concentrically in the second hollow shaft 3b. These rotatable shafts 36, 37, 38, 40 are rotatably supported respectively in the fixed arm member 18, the arm shaft 19, the first hollow shaft 3a, and the second hollow shaft 3b by respective bearings 41, 42, 43, 44. As shown in FIG. 4, the rotatable shaft 36 has a rear end coupled to a drive shaft 15a of the second actuator 15 by a coupling 45 in the housing 17. The rotatable shaft 37 has a rear end coupled to the rotatable shaft 36 by a coupling 46 near the boundary between the fixed arm member 18 and the arm shaft 19. The rotatable shafts 37, 38 are coupled to each other by a coupling sleeve 47 fitted over and splined to splined front and rear ends 37a, 38a of the respective shafts 37, 38 near the boundary between the arm shaft 19 and the wrist base 3'.

As shown in FIG. 3, the second rotation transmitting means 35 has a drive bevel gear 48 corotatably mounted on the distal end of the rotatable shaft 38 (i.e., the distal end of the second rotatable shaft 39), a driven bevel gear 49 meshing with the drive bevel gear 48 and corotatably mounted on the rotatable shaft 40, and a speed reducer 50 fixed concentrically to an end of the second hollow shaft 3b remotely from the third actuator 16. The speed reducer 50 has an input member 50a directly coupled to the rotatable shaft 40 and an output member 50b directly coupled to the wrist 4'.

Therefore, the second rotation transmitting means 35 transmits the rotational drive forces from the second actuator 15 to the speed reducer 50 through the second rotatable shaft 39 (the rotatable shafts 36, 37, 38), the bevel gears 48, 49, and the rotatable shaft 40. After the rotational drive forces are reduced in speed by the speed reducer 50, they are transmitted to the wrist 4' for swinging the wrist 4' about the axis d.

In FIG. 3, the third rotation transmitting means, generally denoted at 51, serves to transmit the rotational drive forces from the third actuator 16 to the wrist socket 5. The third rotation transmitting means 51 comprises the speed reducer 33 with its output member 33b directly coupled to the wrist socket 5, a drive gear 52 connected concentrically to a drive shaft 16a of the third actuator 16 within the wrist 4', a driven gear 55 directly coupled concentrically to an input member 33a of the speed reducer 33 through a rotatable shaft 53, and an idler gear 54 idly rotatably supported on the wrist 4' between the drive and driven gears 52, 55 and meshing with the gears 52, 55.

The third rotation transmitting means 51 transmits the rotational drive forces from the third actuator 16 to the speed reducer 33 successively through the gears 52, 54, 55. After the rotational drive forces are reduced in speed by the speed reducer 33, they are transmitted to the wrist socket 5 for rotating the wrist socket 5 about the axis e.

As described above, the wrist base 3', the wrist 4', and the wrist socket 5 are actuated respectively by the first, second, and third actuators 14, 15, 16. Of these actuators 14, 15, 16, the third actuator 16 is fixed to the wrist 4' closely to the wrist socket 5. Therefore, the third rotation transmitting means 51 for transmitting the rotational drive forces from the third actuator 16 to the wrist socket 5 is very simple in structure, and hence made up of a relatively small number of parts. Since the third actuator 16 is required to actuate only the wrist socket 5 that is subject to a lower load than the wrist base 3' and the wrist 4', the third actuator 16 may be of a small capacity and reduced in size and weight. Accordingly, the loads that must be borne by the arm 2, the wrist base 3', and the wrist 4 are reduced, and they can operate quickly and smoothly without undue stresses.

The first and second actuators 14, 15, from which the rotational drive forces are transmitted to the wrist base 3' and the wrist 4' by the first and second rotation transmitting means 26, 35, respectively, are fixedly mounted on the rear end of the arm 2. While the rotational drive forces from the first and second actuators 14, 15 are transmitted to the distal end of the arm 2 through the first and second rotatable shafts 30, 39 in the arm 2, since the third rotation transmitting means 51 is mounted on the wrist 4', the first and second rotation transmitting means 26, 35 may be designed and constructed without being subject to structural limitations which would otherwise be imposed by the third rotation transmitting means 51. As a consequence, each of the first and second rotation transmitting means 26, 35 may be of a simple structure, made up of a relatively small number of parts.

Of the speed reducers 27, 50, 33 of the first, second, and third rotation transmitting means 26, 35, 51, the speed reducer 27 is mounted on the rear end of the arm 2. Therefore, the distal end of the arm 2 is subject to a reduced load. In the second and third rotation transmitting means 35, 51, the rotational drive forces from the second and third actuators 15, 16 are reduced in speed by the respective speed reducers 50, 33 at the final stage, and transmitted to the wrist 4' and the wrist socket 5. Consequently, the wrist 4' and the wrist socket 5 can operate very accurately as they are substantially free from the backlash of the bevel gears 48, 49 and the gears 52, 53, 54 of the second and third rotation transmitting means 35, 51.

In this regard, the rotational drive forces from the first actuator 14 are reduced in speed by the speed reducer 27 at the initial stage of the first rotation transmitting means 26. However, inasmuch as the rotational drive forces from the speed reducer 27 are transmitted to the wrist base 3' through only a pair of gears, i.e., the gears 28, 29, and the wrist base 3' generally rotates at a relatively low speed, any effect that the backlash of the gears 28, 29 has on the rotation of the wrist base 3' is negligibly small.

The second speed reducer 50 is disposed on one side of the rotatable shaft 40 across the longitudinal axis thereof, and the third actuator 16 is disposed on the other side of the rotatable shaft 40 across the longitudinal axis thereof. Accordingly, the second speed reducer 50 and the third actuator 16 are balanced in weight, allowing the wrist 4' to operate smoothly without undue weight localization. The third speed reducer 33 is positioned between the second speed reducer 50 and the third actuator 16 for further smooth operation of the wrist 4'.

The second rotatable shaft 39 is separable into the rotatable shafts 37, 38 that are splined to each other. Therefore, the wrist base 3', the wrist 4', and the wrist socket 5 can easily be detached from and attached to the arm 2. The arm shaft 19 is fastened to the hollow shaft 21 by the bolts 22, 23 in an intermediate portion of the arm 2, and the second rotatable shaft 39 is separable into the rotatable shafts 36, 37 by the coupling 46 at the junction between the arm shaft 19 and the hollow shaft 21. As a result, the arm 2 can easily be separated into front and rear end portions at the intermediate portion thereof, and the separated front and rear end portions can also easily be combined into the arm 2.

Because the rotatable arm shaft 19 can thus be separated from the wrist base 3' and also from the rest of the arm 2, a plurality of arm shafts 29 having different lengths may be readied for selective use, and a selected one of the arm shafts 29 may be connected to adjust the positions of the wrist base 3', the wrist 4', and the wrist socket 5.

The wrist base 3', the wrist 4', and the wrist socket 5, therefore, can be manufactured easily, and can also be inspected, serviced, or repaired easily and efficiently.

Although a certain preferred embodiment of the present invention has been shown and described in detail, it should be understood that various changes and modifications may be made therein without departing from the scope of the appended claims.

What is claimed is:

1. An industrial robot comprising:
    a robot base;
    a hollow arm extending from said robot base;
    a wrist base mounted on a distal end of said hollow arm for rotation about a longitudinal axis of said hollow arm;
    a wrist mounted on a distal end of said wrist base for swinging movement about an axis transverse to said longitudinal axis;
    a wrist socket mounted on a distal end of said wrist for rotation about an axis parallel to said longitudinal axis;
    a first actuator fixedly mounted on a rear end of said arm remotely from said wrist base, for producing rotational drive forces to rotate said wrist base;
    first rotation transmitting means for transmitting the rotational drive forces from said first actuator to said wrist base, said first rotation transmitting means having a first rotatable shaft extending through said arm;
    a second actuator fixedly mounted on said rear end of said arm, for producing rotational drive forces to swing said wrist;
    second rotation transmitting means for transmitting the rotational drive forces from said second actuator to said wrist, said second rotation transmitting means having a second rotatable shaft extending through said arm;
    a third actuator fixedly mounted on said wrist, for producing rotational drive forces to rotate said wrist socket; and
    third rotation transmitting means mounted on said wrist, for transmitting the rotational drive forces from said third actuator to said wrist socket.

2. An industrial robot according to claim 1, wherein said first rotatable shaft comprises a hollow shaft, and said wrist base is of a hollow cylindrical structure, said wrist having a rotatable shaft, said second rotatable shaft extending through said hollow shaft and said wrist base and being connected to said rotatable shaft of said wrist.

3. An industrial robot according to claim 1, wherein said first, second, and third rotation transmitting means include first, second, and third speed reducers, respectively, for reducing the speed of the rotational drive forces produced by said first, second, and third actuators, respectively, said first speed reducer being directly coupled to said first actuator at the rear end of said arm for reducing the speed of the rotational drive forces from said first actuator at an initial stage of said first rotation transmitting means, said second and third speed reducers being directly coupled to said wrist and said wrist socket, respectively, for reducing the speed of the rotational drive forces from said second and third actuators, respectively, at final stages of said second and third rotation transmitting means, respectively.

4. An industrial robot according to claim 3, wherein said second speed reducer is disposed on one side of said rotatable shaft of said wrist across a longitudinal axis thereof, and said third actuator is disposed on the other side of said rotatable shaft of said wrist across the longitudinal axis thereof.

5. An industrial robot according to claim 4, wherein said third speed reducer is positioned between said second speed reducer and said third actuator.

6. An industrial robot according to claim 1, wherein said first rotatable shaft comprises a plurality of separably connected shafts which are separable away from said wrist base at least at an end of said wrist base closer to said arm, and said second rotatable shaft comprises a plurality of separably connected shafts which are separable away from said wrist base and said robot base at least at said end of said wrist base.

7. An industrial robot according to claim 1, wherein said arm includes a hollow arm member fixed to said robot base, said first rotatable shaft comprising a first hollow shaft inserted in said arm member and a second hollow shaft projecting out of said arm member, said first and second hollow shafts being separably connected to each other at a distal end of said arm member, said second rotatable shaft being inserted in said first rotatable shaft, said second rotatable shaft including first and second shafts separably connected to each other at the distal end of said arm member.

8. An industrial robot according to claim 1, wherein said arm includes a hollow arm member fixed to said robot base, said first rotatable shaft comprising a first hollow shaft inserted in said arm member and a second hollow shaft projecting out of said arm member, said wrist base being separably coupled to a distal end of said second hollow shaft, said first and second hollow shafts being separably connected to each other at a distal end of said arm member, said second rotatable shaft being inserted in said first rotatable shaft, said second rotatable shaft including first and second shafts separably connected to each other at the distal end of said arm member, said first and second shafts of said second rotatable shaft being separable away from said wrist base and said robot base at said distal end of said arm member.

* * * * *